Dec. 16, 1924.
J. W. CALLAHAN
1,519,953
SYSTEM AND APPARATUS FOR DISTRIBUTING LOOSE MATERIAL
Filed Jan. 6, 1923
3 Sheets-Sheet 1

Inventor,
John W. Callahan.
By Gordon Stuart
Attorneys

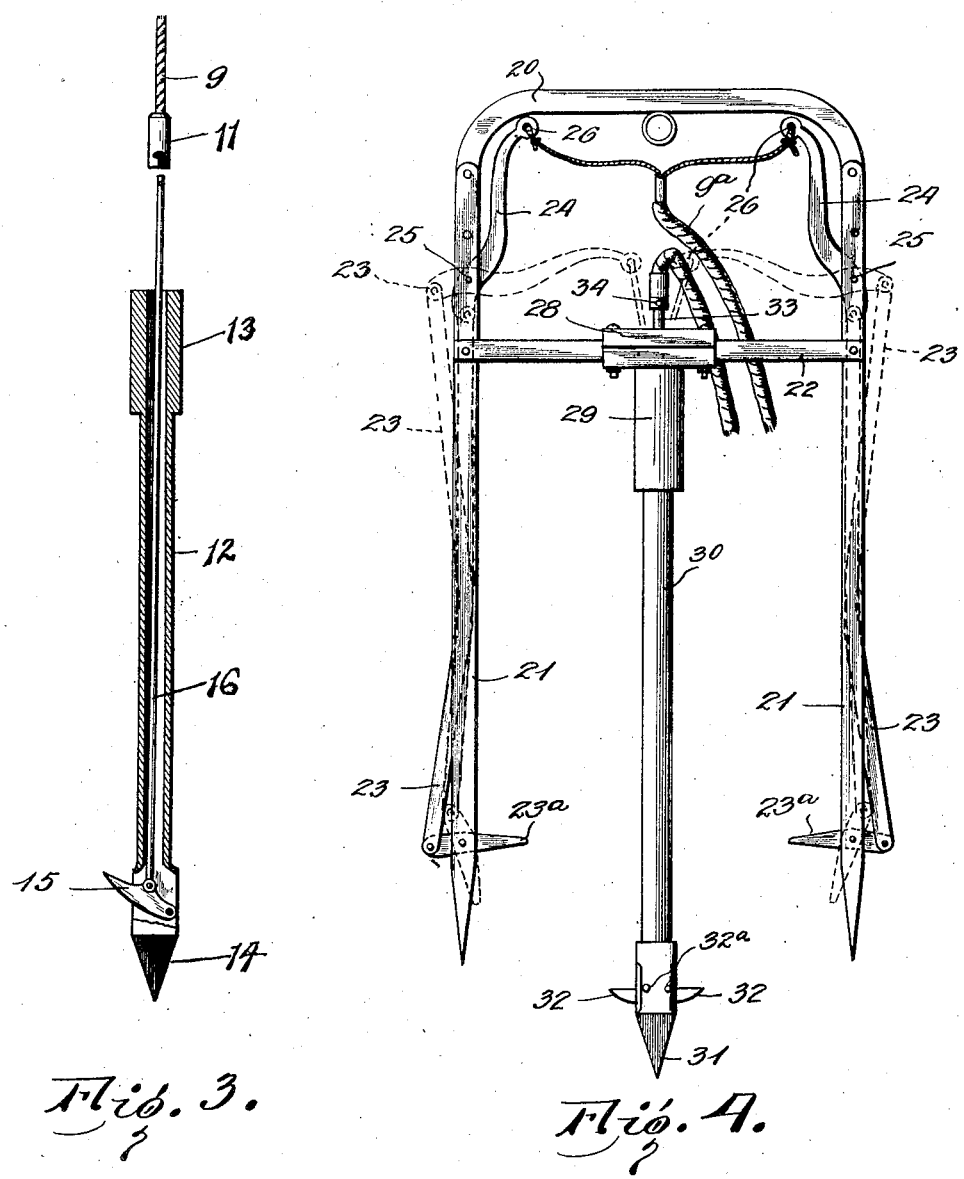

Dec. 16, 1924.
J. W. CALLAHAN
1,519,953
SYSTEM AND APPARATUS FOR DISTRIBUTING LOOSE MATERIAL
Filed Jan. 6, 1923  3 Sheets-Sheet 3
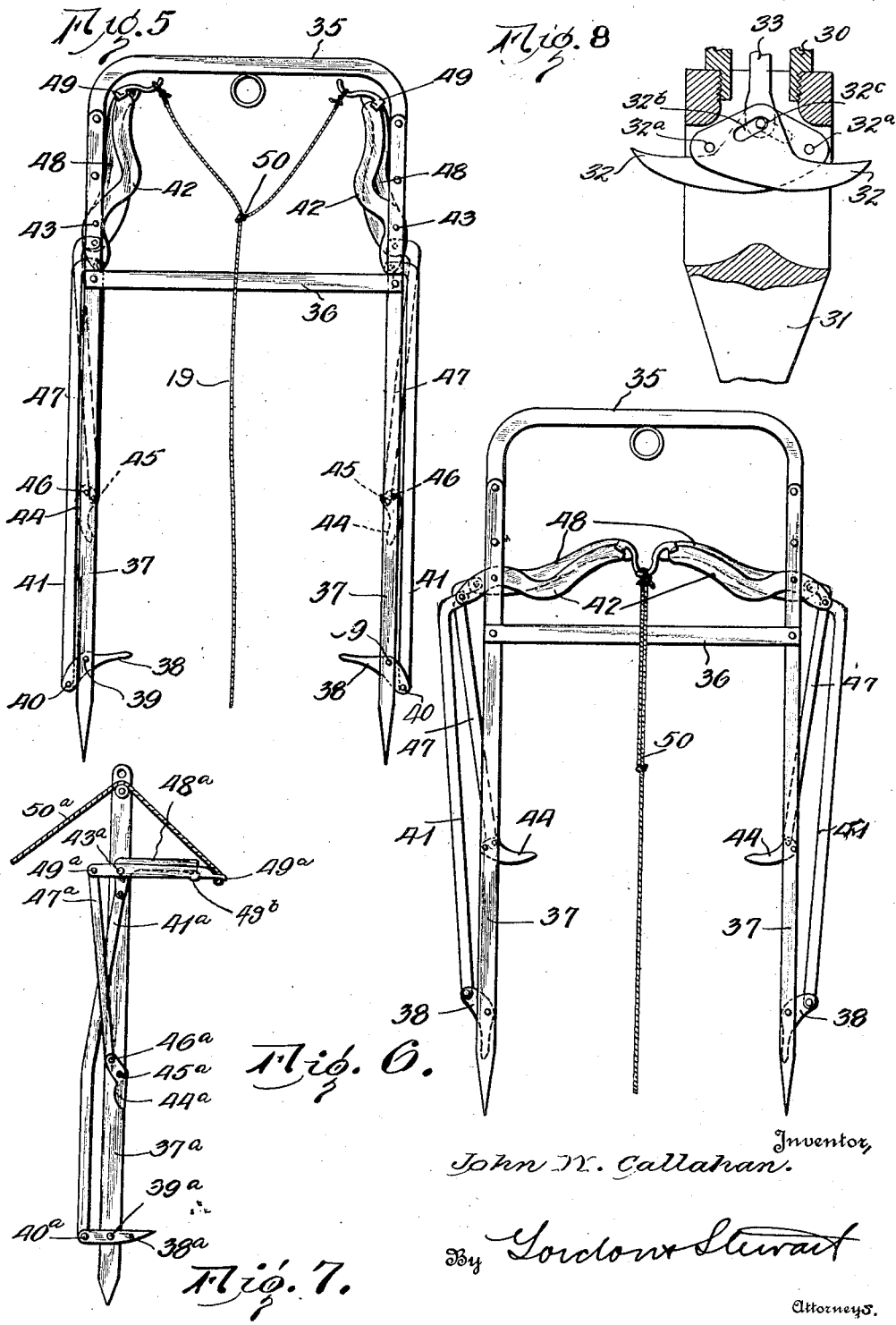

Patented Dec. 16, 1924.

1,519,953

UNITED STATES PATENT OFFICE.

JOHN W. CALLAHAN, OF WELLSBORO, PENNSYLVANIA, ASSIGNOR, BY MESNE ASSIGNMENTS, TO CALLAHAN DISTRIBUTOR COMPANY, INCORPORATED.

SYSTEM AND APPARATUS FOR DISTRIBUTING LOOSE MATERIAL.

Application filed January 6, 1923. Serial No. 611,136.

*To all whom it may concern:*

Be it known that I, JOHN W. CALLAHAN, a citizen of the United States, and a resident of Wellsboro, county of Tioga, and State of Pennsylvania, have invented certain new and useful Improvements in Systems and Apparatus for Distributing Loose Material, of which the following is a full and complete specification, reference being had to the appended drawings.

The usual system of unloading loose interlaced material and distributing the same for storage involves considerable laborious manual labor and even with the present power unloading and distribution means available it is still necessary to employ considerable manual labor to properly separate and handle such material due to its interlocking character. It becomes especially difficult to handle material of this character such as hay within the confines of storage spaces such as are usually found in the holds of ships or hay lofts of barns.

My invention has for its general object the distribution of a mass of loose interlaced material by means of a guide rope or cable passing through the said material and which the mass of loose material tends to follow by virtue of its interlaced character.

My invention has for its main specific object a method of unloading hay and delivering the same within a barn or storage space at any desired points remote from the carrier system by means of a guide rope or cable passing through the mass of hay segregated by the hay fork or unloader.

Still more specifically, the present invention deals with a method of distribution involving the successive steps of engaging a mass of hay or other loose interlaced material by means of a fork or carrier which is then elevated; prior to or during this step threading a guide cable or rope through the carrier of material; so positioning the guide rope as to form a guide between the elevated fork or carrier and the point of destination of the material when released by the fork; and tripping the fork whereby the material is caused to fall by the force of gravity and is directed or guided by means of its interlocking character along the cable or guide rope in such manner as to distribute the material in the direction of the rope, the greater portion of material traveling the full length of the rope.

It is a further object of the present invention to provide improved means for carrying out the above method. It is a still further object of the present invention to construct a hay fork or unloader, the load of which may be released in successive portions.

Several forms of apparatus exemplifying my application are shown in the accompanying drawings, in which:

Fig. 3 shows a form of needle for use in the method of distribution herein described;

Fig. 4 is an enlarged view of the combined fork and needle shown in Fig. 2.

Figs. 5 and 6 show a modified form of hay fork.

Fig. 7 shows another modification of a hay fork, and

Fig. 8 is an enlarged fragmentary view, partly in section, showing details of a double prong needle.

Figure 1:
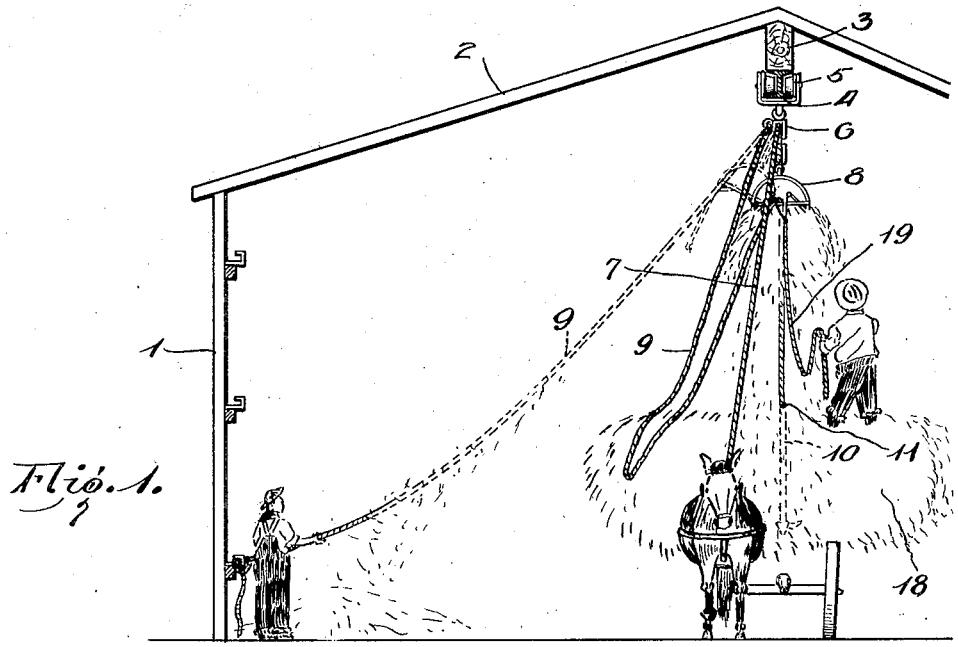
Figure 1 is an elevation of a distributing system as described.
Figure 2:
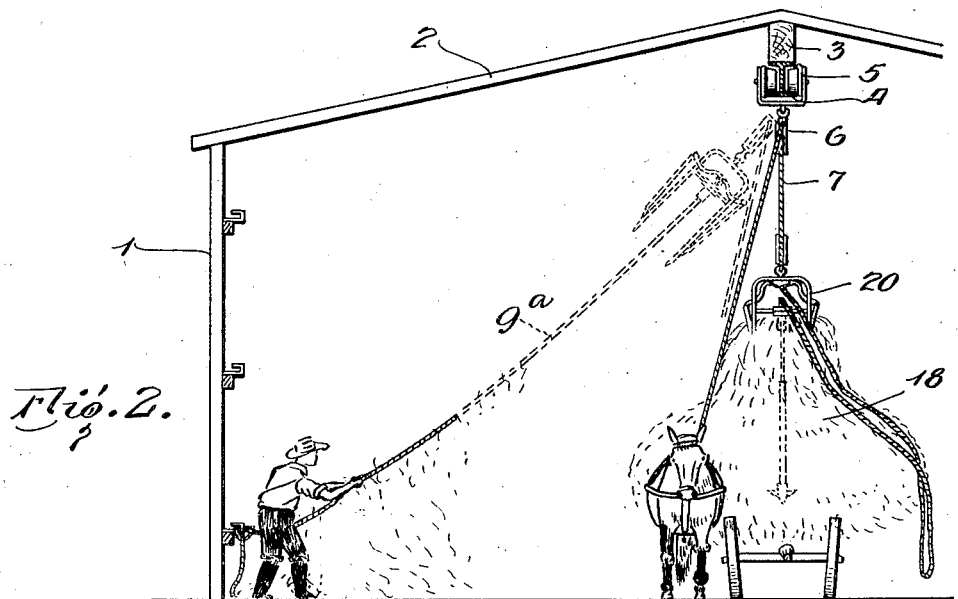
Fig. 2 is a similar view showing a modified tripping means for the hay fork.

The method of distribution involved in my invention is illustrated in Figs. 1 and 2, in which 1 denotes the side wall of the hay barn having a roof 2 and a ridge pole 3. The ridge pole carries an elevated track 4 on which travels a carrier 5 which is capable of movement along the track 4 in the customary manner. Suspended from the carrier 5 is a block and tackle 6, comprising a rope 7, and fastened to the upper frame of a conventional hay fork 8 or unloader having a plurality of barbed tines.

In the modification shown in Fig. 1 a cable or guide rope 9 has its upper end fastened to a point adjacent the position of the hay fork when in its upper position, the guide rope 9, as shown in Fig. 1, having its upper end fastened adjacent the block 6. The lower end of the guide rope is fastened to a needle 10 by means of a quick detachable coupling 11. This needle, which is shown in sectional detail in Fig. 3, comprises a shank portion 12, the upper end of which may be provided with a handle portion 13. The lower end of the needle has a point 14 adapted to readily pierce the hay or loose material and is provided with a barb 15.

The barb has its position controlled by means of a rod 16. When pressure is applied to the upper end of this rod which lies within the axis of the needle, the barb 15 is moved into extended position.

In carrying out the method disclosed in connection with Fig. 1 the needle 10 with the guide rope 9 is first thrust deeply into the load of hay 18, the barb is then moved out by movement of the rod 16 and the needle thereby is locked into the load of hay. The hay fork 8 is then brought down to pierce the load of hay in the usual manner, the barb of the fork being extended to prevent the escape of the material therefrom. As the fork is elevated the needle 10 is left in the main mass of the material with the attached guide cable 9. As the fork is elevated the cable 9 is therefore drawn through the fork full of hay.

The cable 9 is then disconnected from the needle 10 by means of the quick detachable coupling 11, this end of the cable being then carried to or attached to the side wall 1 of the barn by snubbing to a cleat where it is desired to have the material delivered. The trip rope 19 of the hay fork 8 is then actuated and the material held by the fork released. As the guide rope 9 passes through the mass of material held by the fork and as the mass of hay or other material is of interlaced or interlocked character the fork load falling by gravity travels along the guide rope or cable 9 toward its point of attachment, resulting in a distribution of the material wherever it is desired by the operator, even in the most inaccessible portions of the barn.

In Fig. 2, the form of apparatus for carrying out my method is slightly modified in that a different type of hay fork is used in which the needle is made as a part of the fork. This fork 20 is shown in greater detail in Fig. 4 and includes a plurality of parallel tines 21 connected by means of a cross-bar 22. The tines of the fork are slotted longitudinally and carry links 23 moving in such slots and having pivotal connection with barbs 23ª located near the lower ends of the tines and pivoted to swing in the slots in the tines. The upper ends of the links 23 are pivotally connected to levers 24, 24. These levers oscillate around pivots 25 on the upper portions of the tines 21. The inner ends of the levers have eyelets 26 adapted to receive the branches of a combined guide and trip rope 9ª. Centrally of the cross-bar 22 is carried a collar 28 to which is attached a sleeve 29, the latter extending parallel to the tines 21.

A needle 30 extends within the sleeve 29, being frictionally supported therein, and has a lower pointed head 31 through which the lateral barbs 32 project. These barbs are pivoted in the end 31 at the points 32ª and are actuated or thrown into projecting position by means of the upward movement of a central rod 33, the rod being suitably connected to the barbs as by having a pin 32ᶜ thereon operating in slots 32ᵇ in the barbs, as shown in Fig. 8.

The upper end of the rod 33 projects above the needle 30 and has a bayonet joint quick detachable connection 34 with the guide rope which, in this instance, is an extension of the rope 9ª. In the carrying out of my method in which the combined type of fork and needle 20 is used, as shown in Fig. 4, the initial step is to bring the fork 20 down to pierce the load of hay, after which the barbs 24 of the fork 20 are adjusted to prevent the escape of the material. During the downward thrust of the fork the needle 30 also pierces the material and a slight upward pull on the interior rod 33 extends the barbs 32, 32. The fork is then hoisted by means of the block and tackle 6 and the hoisting cable 7.

As the fork is elevated it leaves in the main mass of material the needle 30 and rod 33 to which is still attached the rope 9ª, and thus the rope 9ª is drawn through the fork full of hay. The cable 9ª is then disconnected from the rod 33, drawn comparatively taut, and the free end attached to the side wall 1 of the barn, at the point where it is desired to have the material delivered. After this is done the rope 9ª is pulled, the upper end of the rope being connected to the eyelets 26 of the operating members of the fork, forming a trip rope as previously has been described. The pull on the rope 9ª therefore trips the fork and the load is released and travels down the guide rope in the manner previously described in connection with Fig. 1.

In Figs. 5 and 6 there has been shown a modified form of fork 35 for releasing its load in successive portions. This fork comprises the cross-bar 36 and the parallel tines 37, 37. Two sets of cooperating barbs are arranged by means of which the load may be released in successive steps. A lower pair of barbs 38, 38 are pivoted near the pointed ends of the tines 37, 37 at point 39. The rear ends of the barbs are turned down and connected at their outer ends 40 to links 41 which latter are substantially parallel to the tines 37, 37.

The upper portions of the tines carry opposed bell crank levers 42, 42 pivoted to the tines at points 43. The lower ends of levers 42 are connected to the upper ends of the links 41.

The upper pair of barbs are shown at 44 and are pivoted at 45 to the tines. The rear ends of barbs 44 are pivoted at 46 to links 47. Bell crank levers 48 are pivoted at points 43 to the tines 37 while they are connected at their lower ends to the upper ends of links 47, the free arms of the bell crank levers 48, having lugs 49 thereon, extending over and engaging with the free ends of bell crank levers 42. The ends of the bell crank levers 48, 48 have eyelets for attachment to the branches of a trip rope 50.

The operation of this fork comprises inserting the tines 37 in the material while the barbs 38 and 44 are sheathed in the tines. This occurs when links 48 are substantially vertical and 42 horizontal. The load is retained on the fork by throwing up links 42 which cause barbs 38 to take a horizontal position. When the fork is elevated the barbs 38 retain the full load of hay until such time as tension is put upon trip rope 50. This brings levers 48 down into horizontal position and lugs 49 force levers 42 ahead of levers 48. The barbs then take the position shown in Fig. 5 with the barbs 38 inoperative while the barbs 44 engage the upper portion of the load. As soon as the lower portion of the load is delivered the fork may be transported or moved with the upper portion of the load intact. As soon as the operator desires to release the upper portion of the load he releases the tension on trip rope 50 which permits levers 48, 48 to rise vertically on account of the pressure of the load on barbs 44, 44. In this manner the remaining portion of the load is released and the barbs left in position for a subsequent loading of the fork.

In Fig. 7 there has been shown a modified form of single tined fork for releasing its load in successive portions. This fork comprises a single tined member 37$^a$ having upper and lower barbs 38$^a$ and 44$^a$ respectively pivoted to the tine on pins 39$^a$ and 45$^a$. The position of these barbs is controlled by the bell crank levers 48$^a$ and 49$^a$ pivoted at the common point 43$^a$ on the tine. Links 41$^a$ and 47$^a$ connect the extremities of the operating levers to the lower and upper barbs respectively. A guide rope 50$^a$ is connected to the outer extremity of the lever 49$^a$ in such manner as to give an upward pull on this end of the lever.

In operation the lever 48$^a$ is swung into a vertical position in line with the axis of the tine, and the tine then thrust into the load of hay or into similar material. Lever 48$^a$ is then returned to a horizontal position as shown and the fork raised with the load carried by the bottom barb. When the fork is in the desired position the trip rope is pulled, swinging the lever 49$^a$ into an upright or vertical position, the lever 49$^a$ carrying lever 48$^a$ with it by means of detent 49$^b$. This causes the lower barb 38$^a$ to assume a vertical position and at the same time causes the intermediate positioned barb 44$^a$ to assume a horizontal position, thereby dropping the lower half of the load. A release of the guide rope will now permit the lever 49$^a$ to again assume a horizontal position and the lower half of the barb to drop into a vertical position thereby releasing the second portion of the load.

It is, of course, obvious that the modifications just described in connection with Figs. 5, 6 and 7 may be used independently from the method of distribution herein set forth and that the same may also be used with a guide rope and independent needle as described in connection with Fig. 1, or with a guide rope and needle combined with the fork, as described in connection with Fig. 2. It will also be understood that the needle shown in Figs. 1 and 3 may be made with a plurality of barbs constructed as shown in Fig. 8.

The method of distribution while herein described in connection with a carrier, may be used equally well without the same. The system may be used for stacking hay in the field, the load being lifted to a point above the center of the stack, and the guide rope being held by a person on the ground to allow the load to slide to any desired position on the stack.

It is also obvious that the method of distribution as herein set forth may be practiced with other forms of apparatus than those described herein and that numerous changes may be made in the forms of apparatus described herein without departing from the scope of my invention, as defined in the appended claims.

What is claimed is:

1. The method of transferring a segregated quantity of loose interlaced material from an elevated position to a lower selected point of destination which consists in establishing a guiding means through said quantity connected to said point of destination, and releasing said quantity for travel along said guiding means.

2. The method of transferring a segregated quantity of loose interlaced material which consists in establishing a guiding means through said material, raising said material about said guiding means, flexing said guiding means to extend from said material to a selected point of destination, and releasing said material for travel along said guiding means.

3. The method of distributing loose interlaced material which consists in establishing a guiding means through a mass of said material, segregating a quantity of said material adjacent said guiding means, positioning said guiding means between said quantity and a selected point of destination and releasing said segregated quantity for travel along said guiding means.

4. The method of distributing loose interlaced material which consists in establishing a flexible guiding means through a mass of said material, segregating a quantity of said material surrounding the said guiding means, elevating such segregated quantity, positioning said flexible guiding means between said quantity and selected point of destination at a lower elevation, and releasing said segregated quantity.

5. The method of distributing loose interlaced material which consists in threading a guiding means through a quantity of said material, elevating said quantity, connecting the point to which the quantity has been elevated with a point of destination by said guiding means, and releasing the material.

6. The method of distributing loose interlaced material which consists in segregating a quantity of material, raising said quantity to an elevated position and subsequently releasing said quantity for travel along a gravitational path defined by a flexible guiding means passing through said quantity.

7. The method of distributing loose interlaced material which consists in penetrating a mass of the material with an anchoring means having a flexible guiding means connected thereto, elevating a portion of said material and threading the guiding means therethrough, disconnecting the guiding means from the anchoring means, and connecting the guiding means to a selected point of destination, and releasing said elevated portion of material.

8. A hay fork comprising a plurality of parallel tines, a barb located adjacent the end of each tine, means for manipulating said barbs into operative and inoperative positions, a member mounted centrally in said fork parallel to said tines, a needle normally mounted in said member, and a flexible connection extending between the top of said needle and the barb manipulating means.

9. A hay fork comprising a plurality of parallel tines, a bottom barb located adjacent the end of each tine movable into operative and inoperative positions, means for operating said barbs, a second intermediate barb located on the tines above said bottom barb and movable into operative and inoperative positions and means for operating said intermediate barbs.

10. A hay fork comprising a plurality of parallel tines, a bottom barb located adjacent the end of each tine movable into operative and inoperative positions, a second intermediate barb located on the tines above said bottom barb and movable into operative and inoperative positions, and an interlocking means for causing said intermediate positioned barb to assume an operative position concomitantly with the movement of said bottom barbs into inoperative positions.

11. A hay fork including a tine, a barb located adjacent the end of said tine, means for manipulating said barb into operative and inoperative positions, a second intermediate barb located on said tine above said bottom barb and means for manipulating said second barb independently of said first barb.

In testimony whereof, I have hereunto affixed my signature.

JOHN W. CALLAHAN.